United States Patent [19]

Krude et al.

[11] Patent Number: 5,618,235
[45] Date of Patent: Apr. 8, 1997

[54] CONSTANT VELOCITY UNIVERSAL JOINT

[75] Inventors: Werner Krude, Neunkirchen; Peter Harz, Hennef, both of Germany

[73] Assignee: GKN Automotive AG, Germany

[21] Appl. No.: 384,363

[22] Filed: Feb. 1, 1995

Related U.S. Application Data

[63] Continuation of Ser. No. 32,268, Mar. 17, 1993, abandoned.

[30] Foreign Application Priority Data

Apr. 7, 1992 [DE] Germany .......................... 42 11 596.5
Jan. 29, 1993 [DE] Germany .......................... 43 02 432.7

[51] Int. Cl.$^6$ .................................................. F16D 3/224
[52] U.S. Cl. ............................................ 464/145; 464/906
[58] Field of Search ..................................... 464/145, 143, 464/906, 144, 146

[56] References Cited

U.S. PATENT DOCUMENTS

| 2,825,213 | 3/1958 | Dunn. | |
|---|---|---|---|
| 4,275,571 | 6/1981 | Welschof | 464/145 |
| 4,453,395 | 6/1984 | Takeda et al. . | |
| 4,698,047 | 10/1987 | Welschof et al. | 464/145 |
| 4,795,404 | 1/1989 | Sutton | 464/111 |
| 4,846,764 | 7/1989 | Hazebrook et al. | 464/145 |
| 5,217,410 | 6/1993 | Schwärzler | 464/906 |

FOREIGN PATENT DOCUMENTS

| 0062067 | 10/1982 | European Pat. Off. . | |
|---|---|---|---|
| 0169091 | 1/1986 | European Pat. Off. . | |
| 785242 | 1/1935 | France . | |
| 2172580 | 9/1973 | France . | |
| 2592110 | 6/1987 | France . | |
| 2610682 | 10/1987 | France . | |
| 2592110 | 6/1990 | France . | |
| 6809359 | 11/1968 | Germany . | |
| 2330539 | 1/1974 | Germany . | |
| 2831043A1 | 6/1979 | Germany . | |
| 3606075A1 | 8/1986 | Germany . | |
| 3726166A1 | 2/1988 | Germany . | |
| 3836022C2 | 10/1989 | Germany . | |
| 3233753 | 6/1990 | Germany . | |
| 3509013C2 | 1/1993 | Germany . | |
| 58-008831 | 1/1983 | Japan . | |
| 61-171923 | 8/1986 | Japan . | |
| 3-65023 | 6/1991 | Japan . | |
| 1055482 | 1/1967 | United Kingdom . | |
| 2034001 | 5/1980 | United Kingdom | 464/145 |

OTHER PUBLICATIONS

Japanese abstract of 60–175826, published Jan. 21, 1986.
Küttner, K.H. et al., *Dubbel—Taschenbuch für den Mashinenbau*, pp. 960–973, Springer–Verlag, 1983.

*Primary Examiner*—Daniel P. Stodola
*Assistant Examiner*—Eileen A. Dunn
*Attorney, Agent, or Firm*—Harness, Dickey & Pierce, PLC

[57] ABSTRACT

An outer joint part is produced by forming in such a way that the torque transmitting capacity is substantially increased and that the production costs, essentially do not rise. This is achieved in that at the outwardly open axial end of the cavity of the outer joint part, there is arranged a radially outwardly directed collar-shaped flange.

9 Claims, 5 Drawing Sheets

5,618,235

CONSTANT VELOCITY UNIVERSAL JOINT

This is a continuation of U.S. patent application Ser. No. 08/032,268, filed Mar. 17, 1993, now abandoned.

FIELD OF THE INVENTION

The invention relates to a constant velocity universal joint having an outer joint part produced from steel plate by deep-drawing, designed to be undercut-free and comprising a cavity and formed in outer running grooves. The joint further has an inner joint part, with rolling members establishing a torque connection between the outer joint part and the inner joint part.

BACKGROUND AND SUMMARY OF THE INVENTION

It is known to produce an outer joint part by forming (JP-GBm publication 3-65023).

The constant velocity joint described in the above referenced publication is provided with an outer joint part designed to be substantially cylindrical. No measures are taken to increase the torque transmitting capacity of the joint.

Furthermore, it is known to secure the convoluted boot covering the joint on a radially outwardly pointing flange arranged at the open end of the joint cavity (FR-2592110 A1).

In the above referenced document, the outer circumference of the flange is provided with a groove to ensure an accurate fit of the boot. This means that, at least for providing the groove, it is essential to carry out a turning operation.

It is the object of the present invention to avoid any kind of chip-forming machining in the case of an outer joint part produced from steel plate metal by deep-drawing and to design the outer joint part in such a way that an adequate degree of finish on the outer joint's bearing surfaces is ensured.

In accordance with the invention, the objective is achieved in that the outwardly open end of the cavity of the outer joint part is provided with a radially outwardly pointing collar-shaped flange which remains undeformed during the deep-drawing operation, and thus has the same thickness as the wall of the outer joint part with the groove-free collar-shaped flange serving as a seat for the convoluted boot sealing the joint.

In the case of the constant velocity joint designed in accordance with the invention, the torque transmitting capacity of the outer joint part is substantially increased as a result of the formed-on collar-shaped flange.

Because of the groove-free design of the collar-shaped flange, there is no need for machining the outer circumference of the flange.

In an advantageous embodiment of the invention, the collar-shaped flange is embraced by a thin-walled ring comprising bead-shaped indentations.

According to a further advantageous feature of the invention, the collarshaped flange is arranged at the outer joint part of a ball joint.

And in yet a further advantageous embodiment of the invention, the collarshaped flange is arranged at the outer joint part of a tripod joint.

The advantageous design involving a collar-shaped flange is suitable for both a ball joint and a tripod joint.

According to a further advantageous embodiment of the invention it is proposed that after the outer joint part has been formed and subsequently casehardened and after the inner joint parts have been assembled, the outer joint part should be partially deformed for the purpose of axially securing the inner joint parts.

It has been found that contrary to all expectations, it is possible, after carrying out the case-hardening operations, to subject the outer joint parts to a limited amount of deformation which is sufficient for axially securing the inner joint parts.

According to a further feature of the invention, the constant velocity universal joint comprises an inner joint part with inner running grooves corresponding to the outer running grooves and having torque transmitting balls which are received in the inner and outer running grooves and which are held in the windows of a cage guided between the outer joint part and inner joint part, with the outer joint part, at the open axial end of its cavity between the outer running grooves, being radially inwardly deformed. This measure ensures that the cage and thus the inner joint part are secured axially outwardly.

In a further embodiment of the invention, the constant velocity universal joint comprises an outer joint part with axially extending guiding grooves arranged parallel relative to one another and comprising Two guiding faces facing one another, as well as an inner joint part with radially arranged arms corresponding to the guiding grooves, with each of the arms via a roller assembly, being in contact with an associated guiding groove and with the outer joint part, at the open end of its cavity in the region of the guiding faces, being provided with deformed regions pointing towards the center line of the guiding grooves.

In this way, the inner parts of a tripod joint are also secured axially.

DESCRIPTION OF THE DRAWINGS

Below, the invention will be explained in greater detail with reference to embodiments illustrated in the drawings wherein.

DESCRIPTION OF THE PREFERRED EMBODIMENT

Figure 1:
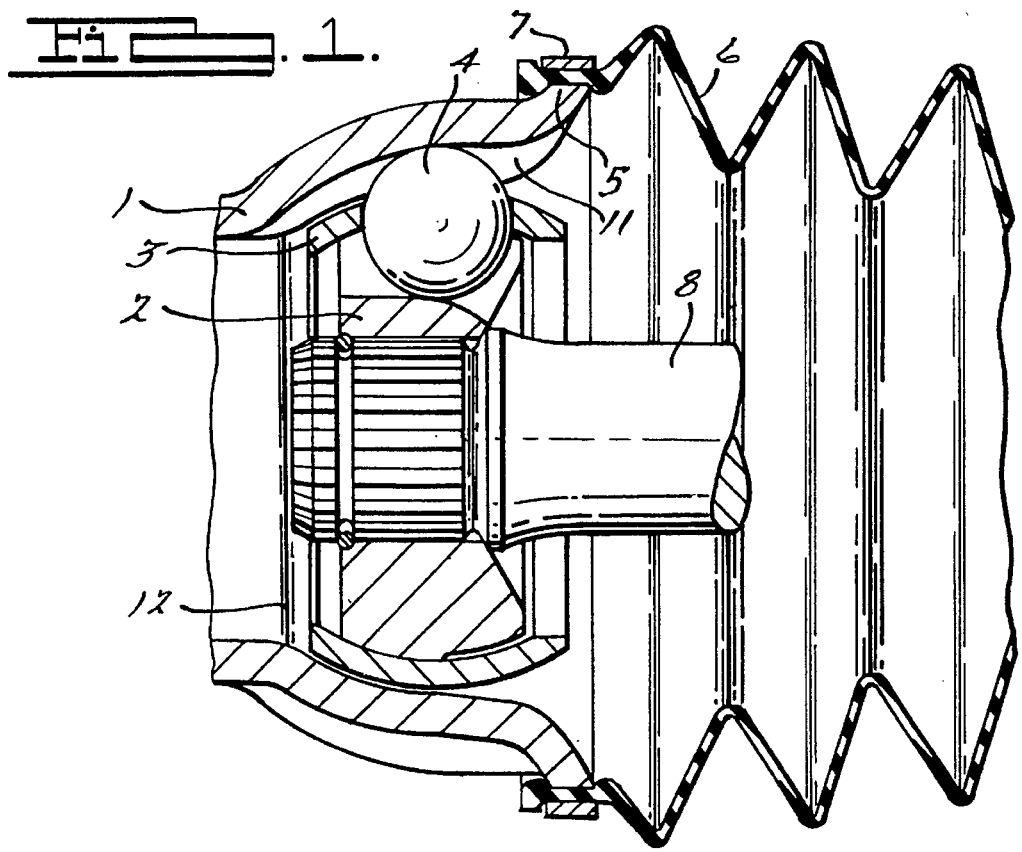
FIG. 1 is a longitudinal cross section through section lines 1—1 of FIG. 1a of a constant velocity universal joint in accordance with the present invention, designed as a fixed ball joint.
Figure 1A:
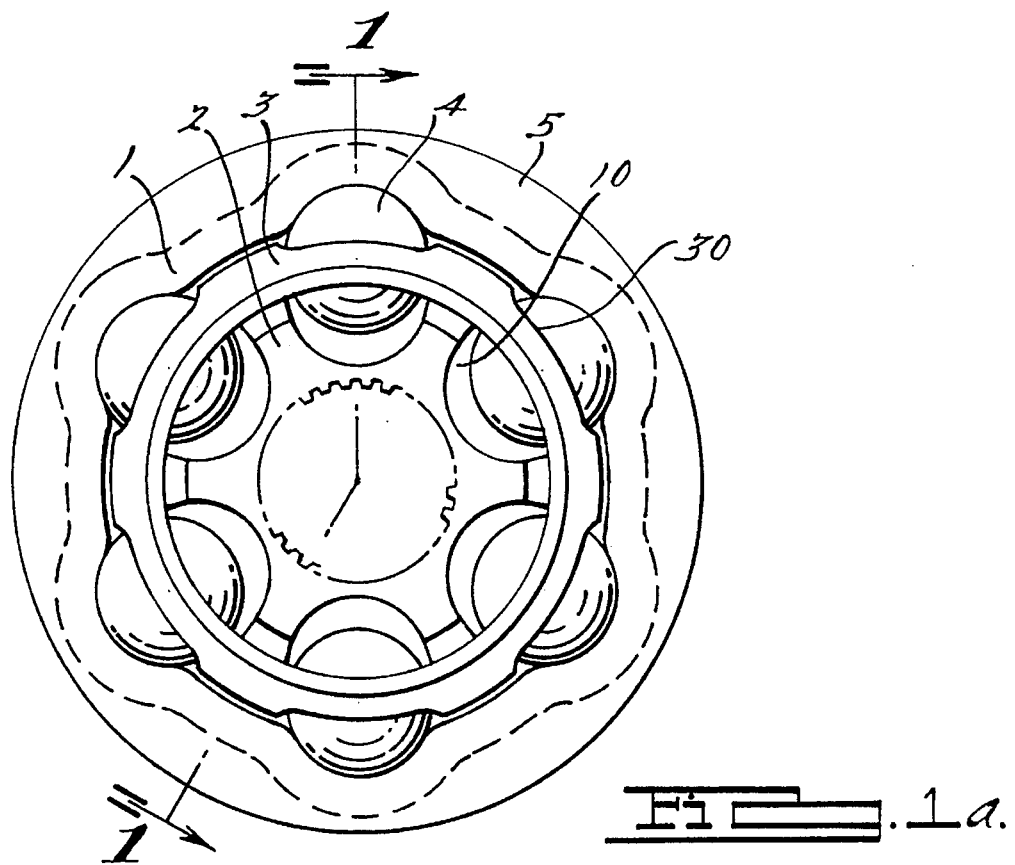
FIG. 1a is a plan view of the joint according to FIG. 1.

The constant velocity universal joint illustrated in FIG. 1 and designed as a fixed ball joint comprises an outer joint part 1, an inner joint part 2 and a cage 3 which is received between the outer joint part 1 and the inner joint part 2 and whose windows 30 hold torque transmitting balls 4. Outer joint part 1 is produced from a steel plate by deep-drawing.

The open end of the outer joint part 1 is provided with a radially outwardly pointing collar-shaped flange 5 which, has the same wall thickness as the wall of the outer joint part and at the same time, serves as a seat for a convoluted boot 6 which is held on the collar-shaped flange 5 by a tension ring 7.

Two radially inwardly pointing annular beads are provided at the end of the convoluted boot 6 which serves to secure the boot to the collar-shaped flange.

The balls 4, for torque transmitting purposes, are received in outer running grooves 11 of the outer joint part 1 and in inner running grooves 10 of the inner joint part 2.

A shaft 8 is introduced into the inner joint part 2 and secured against any axial displacement.

Figure 2:
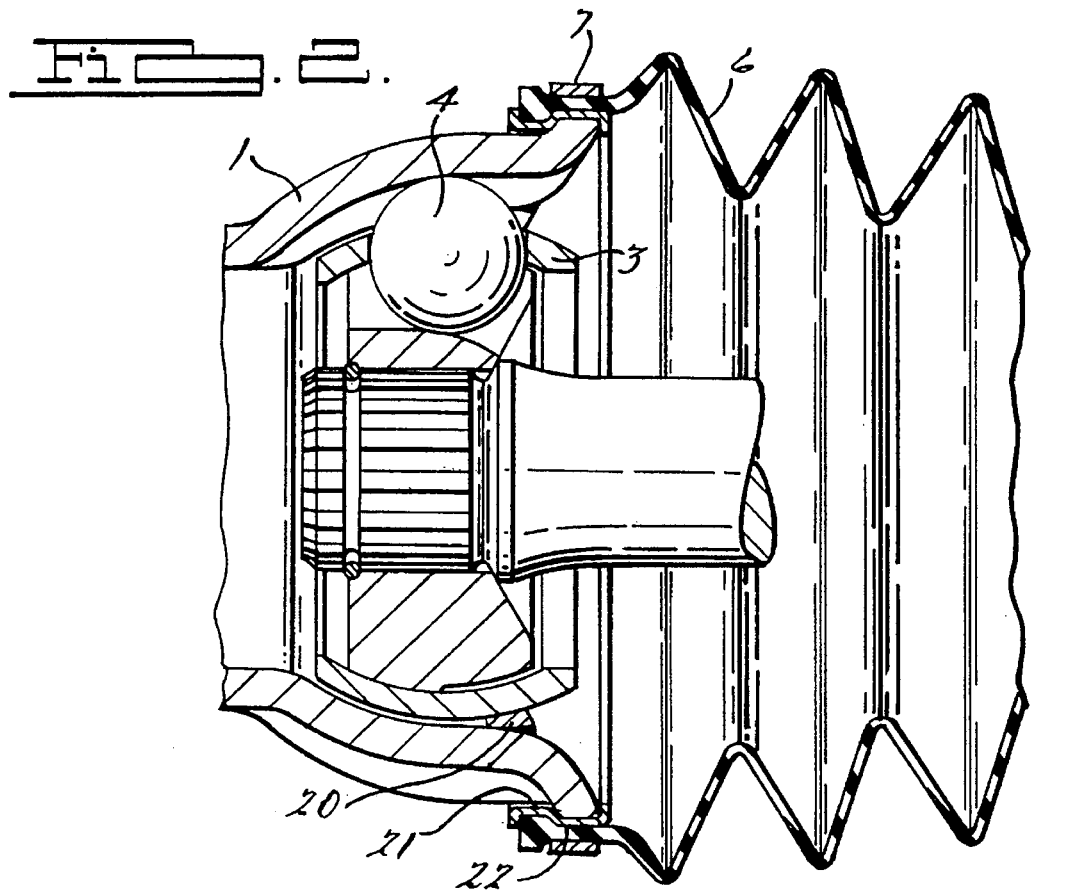
FIG. 2 is a longitudinal cross section through section lines 2—2 of FIG. 2a of a constant velocity universal joint designed as a ball joint having wedge-shaped inserts for axially securing the cage.

The joint illustrated in FIG. 2 substantially corresponds to that shown in FIG. 1, and for axially securing the cage, wedge-shaped inserts 20 are arranged in the outer joint part between the outer running grooves 11.

In contrast to FIG. 1, a thin walled ring 22 is arranged on the collar-shaped flange 5 of the outer joint part. The convoluted boot 6 is held by a bead engaging a radially inwardly directed Bead-shaped indentation 21.

Figure 2A:
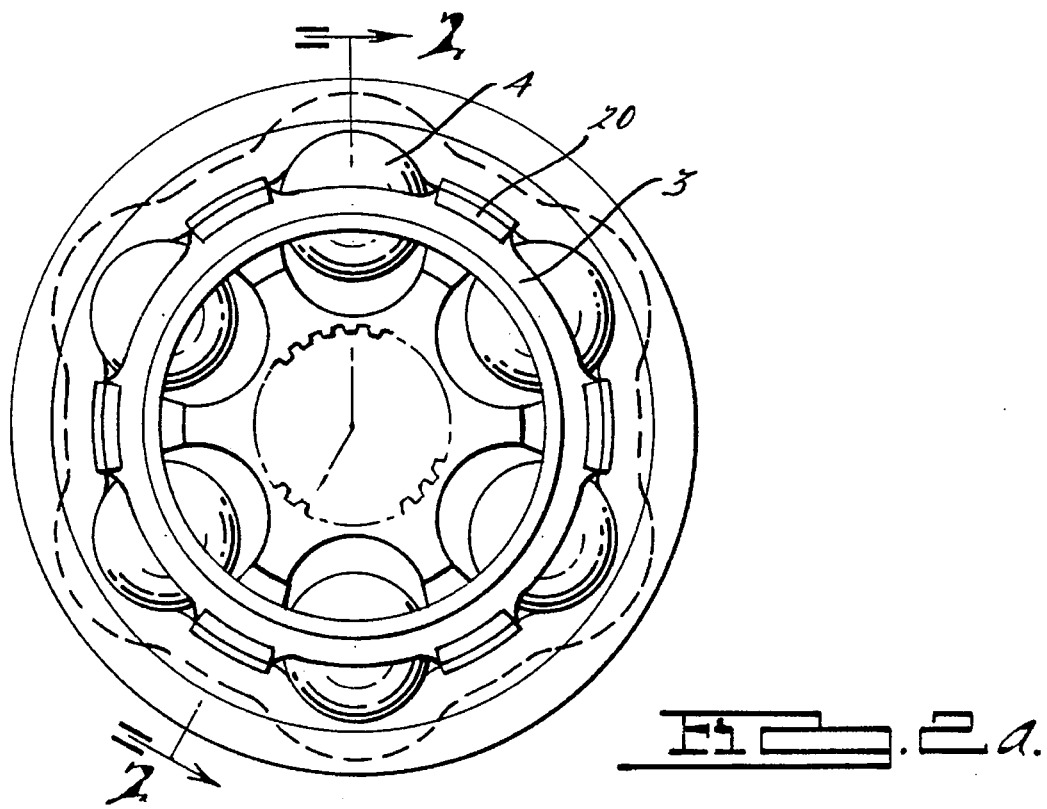
FIG. 2a is a plan view of the embodiment according to FIG. 2.

FIG. 2a, in a plan view, shows the arrangement of the wedge-shaped inserts between the outer running grooves 11.

Figure 3:
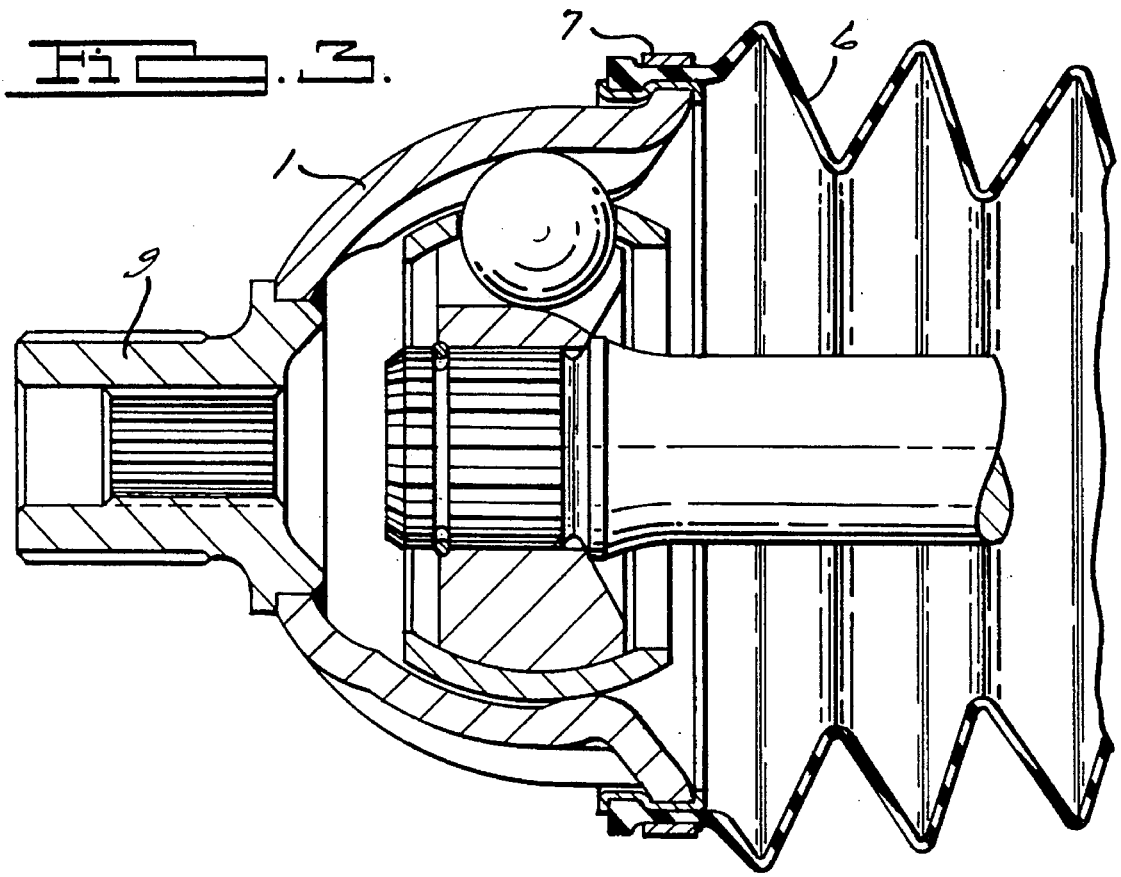
FIG. 3 is a longitudinal cross section through section lines 3—3 of FIG. 3a of a constant velocity universal joint having inwardly deformed regions for axially securing the cage.

FIG. 3 shows an embodiment of a constant velocity universal joint in the case of which regions of the outer joint part 1 arranged between the outer running grooves 11 are radially inwardly deformed at the open end.

Figure 3A:
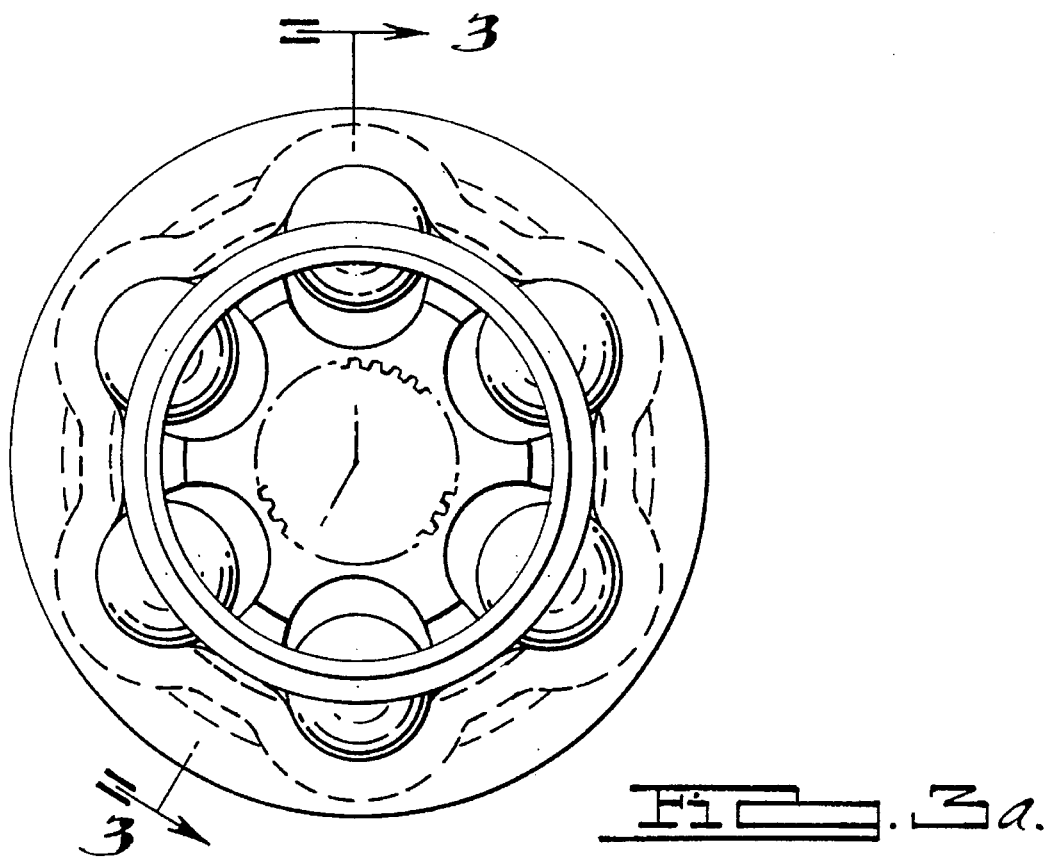
FIG. 3a is a plan view of the design according to FIG. 3.

FIG. 3a is a plan view of the design according to FIG. 3.

Figure 4:
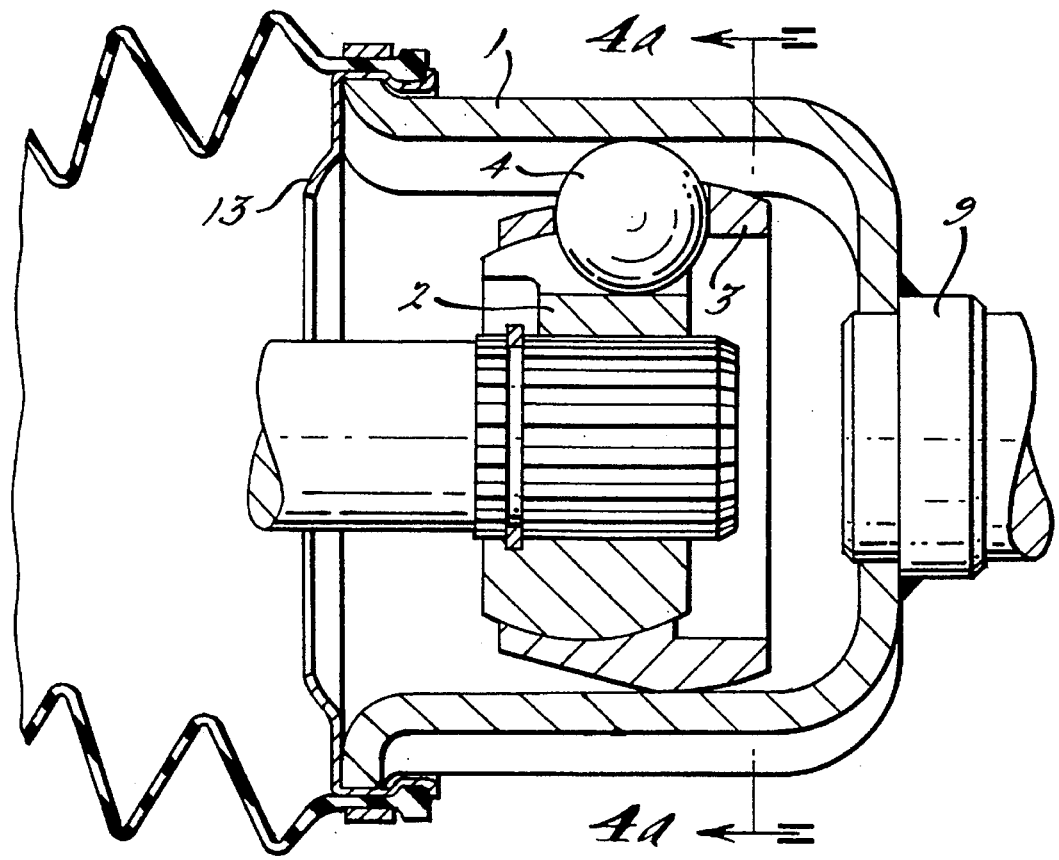
FIG. 4 is a longitudinal cross section view through section lines 4—4 of FIG. 4a of a constant velocity universal joint in accordance with the present invention, designed as a plunging ball joint.

FIG. 4 is a longitudinal section through a constant velocity universal joint which is designed as a plunging joint and in the case of which the cage is axially secured by a plate metal disc 13.

Figure 4A:
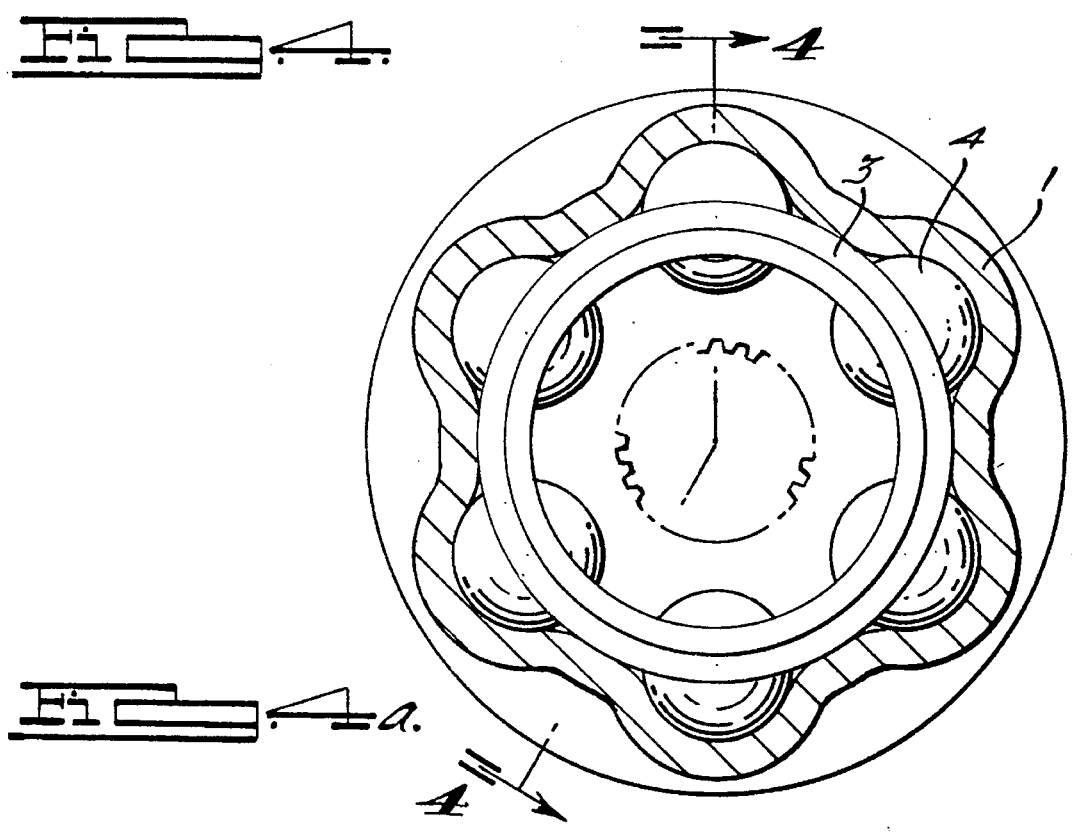
FIG. 4a is a plan cross section view through lines 4a—4a of FIG. 4 of the embodiment according to FIG. 4.

FIG. 4a is a sectional plan view of the design shown in FIG. 4.

Figure 5:
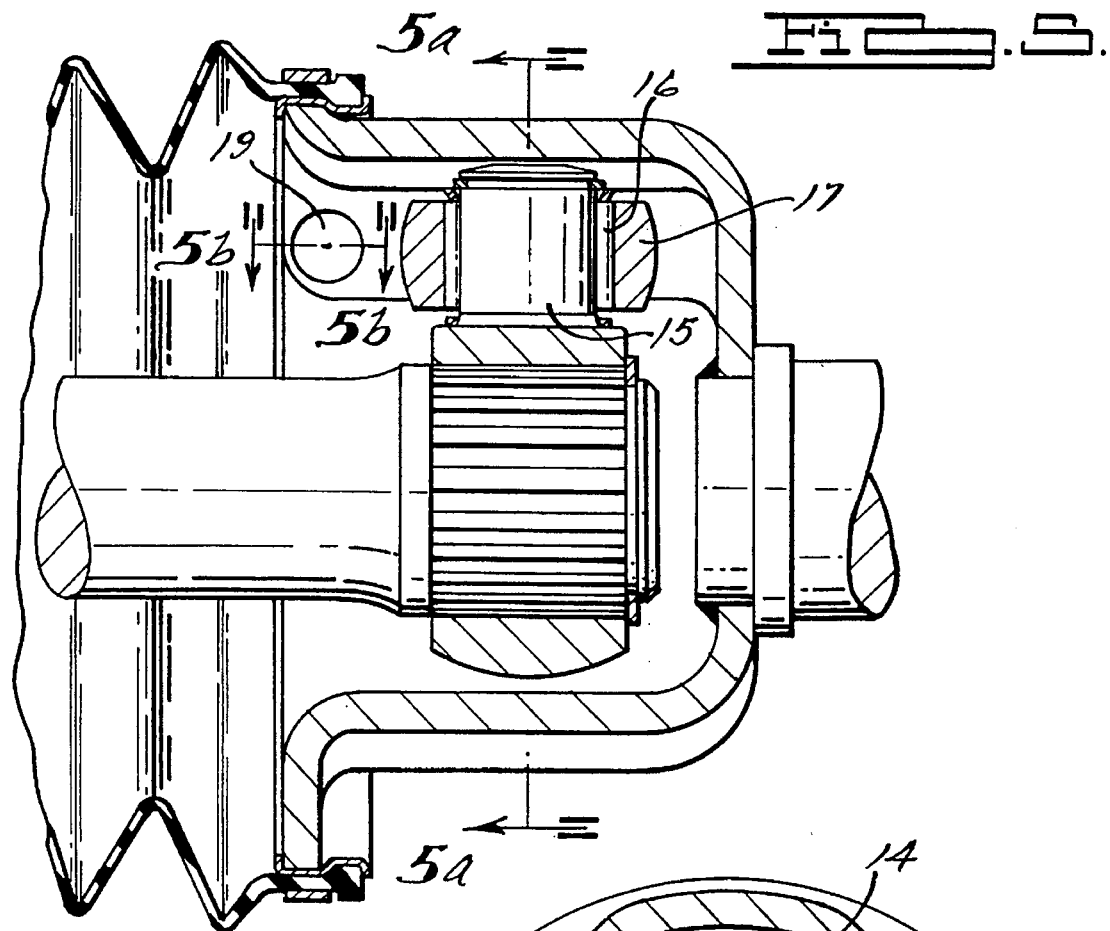
FIG. 5 is a longitudinal cross sectional view through a constant velocity universal joint designed as a tripod joint.

FIG. 5 illustrates a constant velocity universal joint designed as a tripod joint in the case of which the arms 15 of the inner joint part are guided in guiding grooves 14 of the outer joint part 1.

The guiding faces 18 associated with the guiding grooves 14 support the rollers 17 of a needle bearing 16.

Figure 5A:
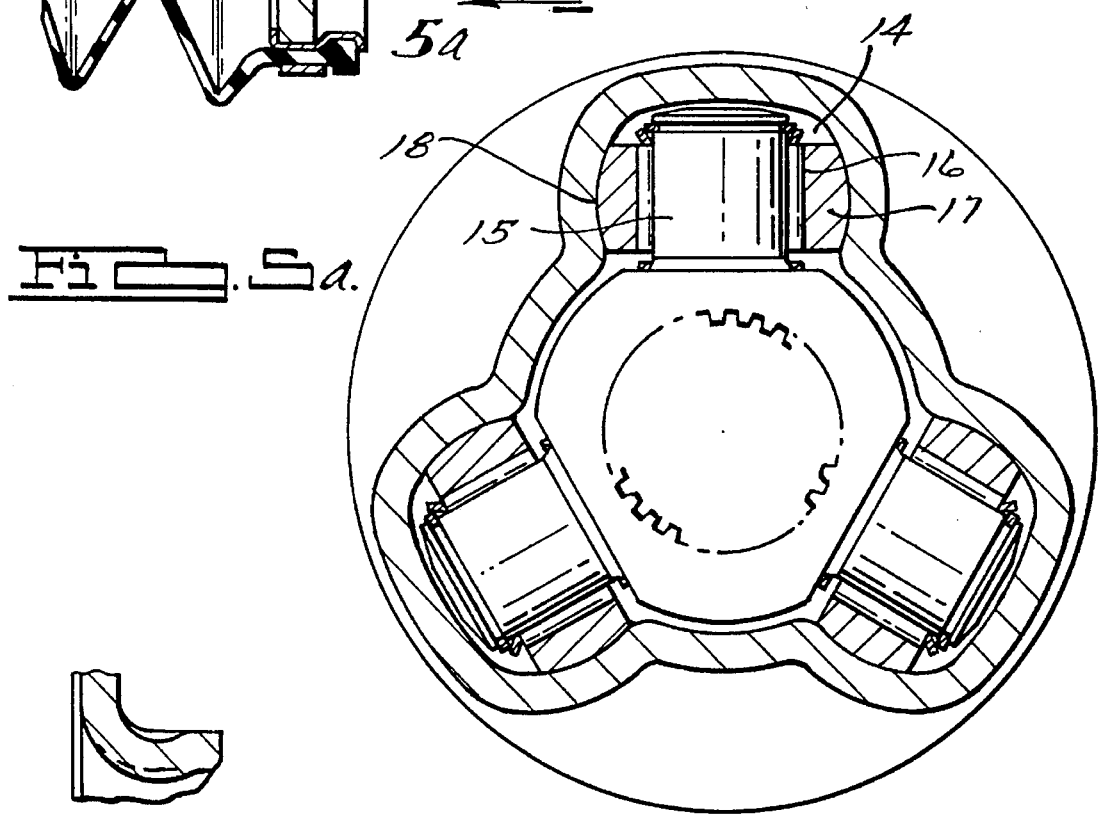
FIG. 5a is a plan cross sectional view through lines 5a—5a of FIG. 5 of the design according to FIG. 5.
Figure 5B:
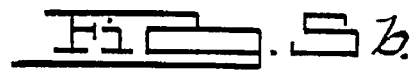
FIG. 5b is an enlarged cross sectional view through section lines 5b—5b of FIG. 5.

For the purpose of axially securing the inner joint part, the open axial end of the outer joint part 1 is provided with inwardly directed deformations 19 as shown in FIG. 5b.

FIG. 5a is a sectional plan view of the tripod joint according to FIG. 5.

What is claimed is:

1. A constant velocity universal joint comprising:

an outer joint part having a wall which includes first portions defining a plurality of circumferentially spaced outer running grooves and second portions defining a plurality of segments with each segment being disposed between each pair of adjacent outer running grooves, said first and second portions of said wall having generally uniform wall thickness, said wall thickness of said first portions being equal to said wall thickness of said second portions said wall of said outer joint part further defining a cavity having an open end and a radially outwardly pointing collar-shaped flange disposed at said open end, said flange having a wall thickness generally equal to said wall thickness of said first and second portions and having a groove-free outer edge, said outer edge of said flange serving as a seat for a convoluted boot to seal said joint;

an inner joint part disposed in said cavity; and a plurality of balls disposed in said cavity and mating with said inner joint part and said outer running grooves of said outer joint part for establishing a torque connection between said outer joint part and said inner joint part.

2. The constant velocity universal joint according to claim 1 wherein said wall of said outer joint part is deformed adjacent to said open end in order to engage a component of said constant velocity universal joint to secure said inner joint part within said cavity.

3. The constant velocity universal joint according to claim 1 further comprising a cage having a plurality of windows, said cage disposed within said cavity between said outer joint part and said inner joint part, said inner joint part having a plurality of inner running grooves corresponding to said outer running grooves, said plurality of balls being received in said inner running grooves and said outer running grooves and held in position by said plurality of windows of said cage, said wall of said outer joint part being radially inwardly deformed in order to engage said cage to secure said inner joint part within said cavity.

4. The constant velocity universal joint according to claim 1 wherein said collar-shaped flange is embraced by a thin-walled ring having bead-shaped indentations.

5. The constant velocity universal joint according to claim 4 wherein said wall of said outer joint part is deformed in order to engage a component of said constant velocity universal joint to secure said inner joint part within said cavity.

6. The constant velocity universal joint according to claim 4 further comprising a cage having a plurality of windows, said cage disposed within said cavity between said outer joint part and said inner joint part, said inner joint part having a plurality of inner running grooves corresponding to said outer running grooves, said plurality of balls being received in said inner running grooves and said outer running grooves and held in position by said plurality of windows of said cage said wall of said outer joint part being radially inwardly deformed in order to engage said cage to secure said inner joint part within said cavity.

7. A constant velocity universal joint comprising:

an outer joint part having a wall which includes first portions defining a plurality of circumferentially spaced outer running grooves and second portions defining a plurality of segments with each segment being disposed between each pair of adjacent outer running grooves, said first and second portions of said wall having generally uniform wall thickness, said wall thickness of said first portions being equal to said wall thickness of said second portions, said wall of said outer joint part further defining a cavity having an open end and a radially outwardly pointing collar-shaped flange disposed at said open end, said flange having a wall thickness generally equal to said wall thickness of said first and second portions and having a groove-free outer edge; said outer edge of said flange serving as a seat for a convoluted boot to seal said joint;

an inner joint part disposed in said cavity, said outer joint part being deformed adjacent to said open end in order to engage a component of said constant velocity universal joint to secure said inner joint part within said cavity; and a plurality of rolling members disposed in said cavity and mating with said inner joint part and said outer running grooves of said outer joint part for establishing a torque connection between said outer joint part and said inner joint part.

8. The constant velocity universal joint according to claim 7 further comprising a cage having a plurality of windows said cage disposed within said cavity between said outer joint part and said inner joint part, said inner joint part having a plurality of inner running grooves corresponding to said outer running grooves, said plurality of rolling members being received in said inner running grooves and said outer running grooves and held in position by said plurality of windows of said cage, said wall of said outer joint part being radially inwardly deformed in order to engage said cage to secure said inner joint part within said cavity.

9. The constant velocity universal joint according to claim 7 wherein said plurality of outer running grooves comprises three axially extending guiding grooves arranged generally parallel to one another and having two opposing guiding faces, said inner joint part comprising three radially aligned arms corresponding to said three guiding grooves and a roller assembly disposed on each of said arms for engaging a respective guiding groove, said wall of said outer joint part having at least one inwardly deformed region disposed at said open end of said cavity in the region of said guiding faces in order to engage a respective roller assembly to secure said inner joint part within said cavity.

\* \* \* \* \*